United States Patent [19]

Okamoto et al.

[11] Patent Number: 5,104,240

[45] Date of Patent: Apr. 14, 1992

[54] RELEASE BEARING ASSEMBLY

[75] Inventors: Hiroshi Okamoto, Okazaki; Yukihisa Takashi, Toyoake; Masaru Ebata, Chita, all of Japan

[73] Assignee: Aisin Seiki Kabushiki Kaisha, Kariya, Japan

[21] Appl. No.: 675,520

[22] Filed: Mar. 27, 1991

[30] Foreign Application Priority Data

Mar. 31, 1990 [JP] Japan ................................. 2-85872

[51] Int. Cl.⁵ ........................................... F16C 19/06
[52] U.S. Cl. ....................................... 384/510; 384/539
[58] Field of Search .............. 384/510, 560, 559, 539, 384/537, 584

[56] References Cited

U.S. PATENT DOCUMENTS

| | | | |
|---|---|---|---|
| 2,536,819 | 1/1951 | Lyman | 384/539 |
| 2,607,642 | 8/1952 | Gilbert | 384/539 |
| 4,746,231 | 5/1988 | Hoshino | 384/539 |
| 4,940,342 | 7/1990 | Miyazawa et al. | 384/510 |

*Primary Examiner*—Lenard A. Footland
*Attorney, Agent, or Firm*—Burns, Doane, Swecker & Mathis

[57] ABSTRACT

There is disclosed an improved release bearing assembly that is component of the pull-type clutch cover of a friction clutch mounted in an automobile. The release bearing assembly comprises a bearing body capable of moving axially within a given range, a retainer ring holding a diaphragm spring, a sleeve disposed between the bearing body and the ring, several resilient sheets extending from the flange of the sleeve axially of the sleeve, fingers formed at the front ends of the resilient sheets, and a release groove formed in the outer surface of the sleeve. The resilient sheets are circumferentially spaced from each other. The sleeve can slide on the bearing body between a first position and a second position. In the first position that is close to the retainer ring, the sleeve clamps the ring against the bearing body via the fingers. In the second position, the resilient sheets can play within a release groove formed in the bearing body, so that the ring disengages from the bearing body.

6 Claims, 6 Drawing Sheets

Fig. 12
Fig. 13
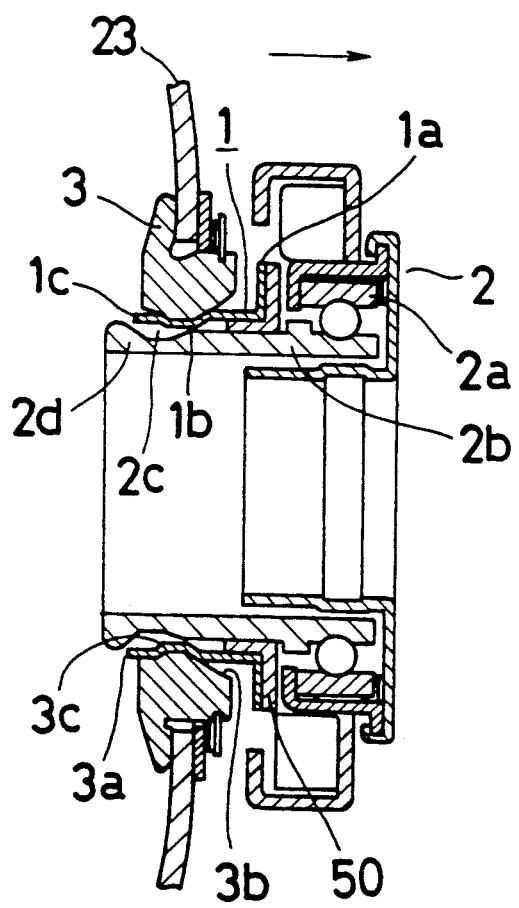
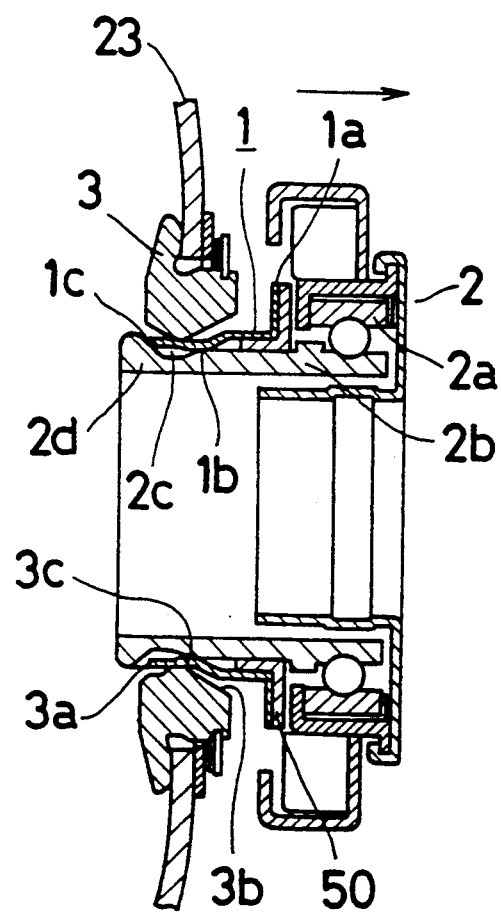

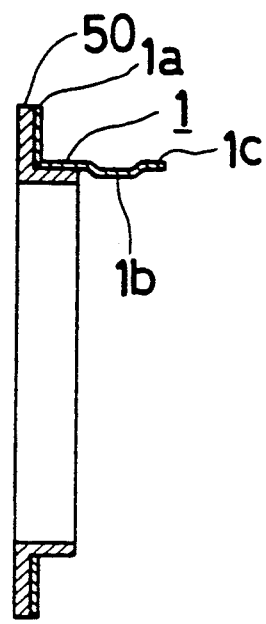
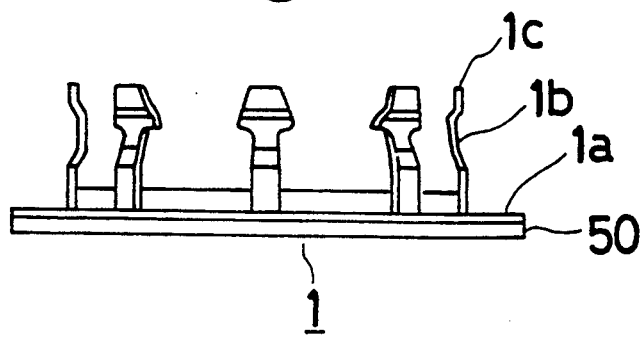
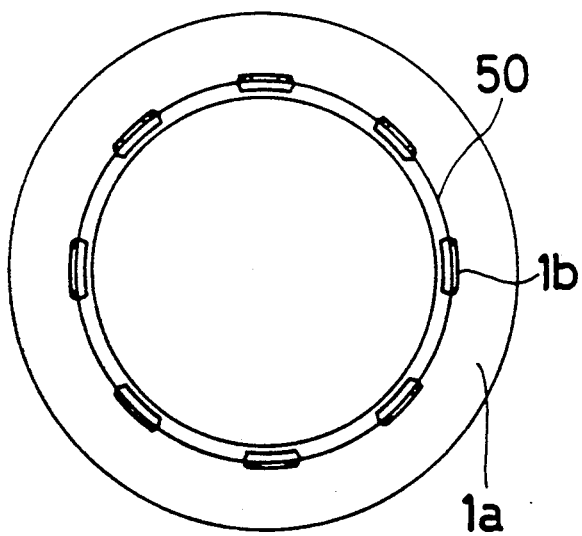
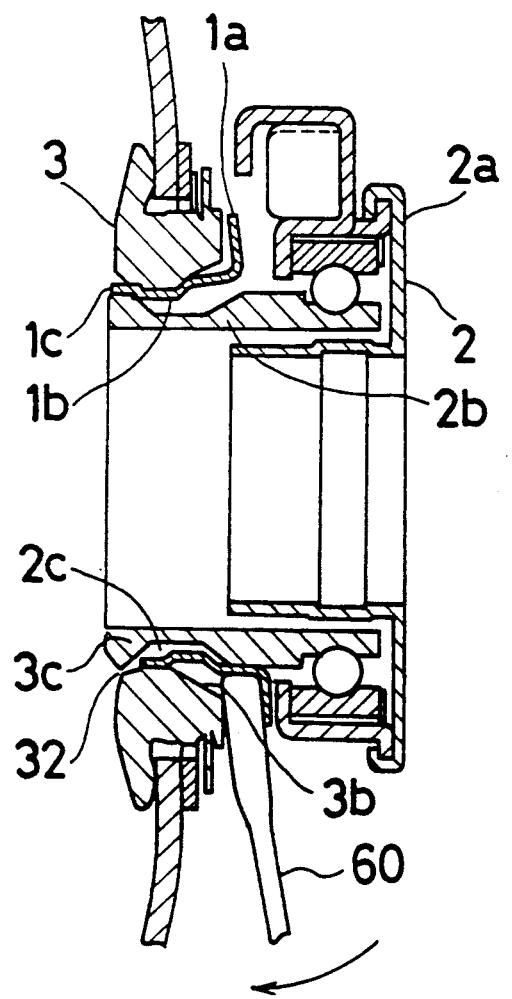

RELEASE BEARING ASSEMBLY

FIELD OF THE INVENTION

The present invention relates to improvements in a release bearing assembly that is a component of the pull-type clutch cover of a friction clutch mounted in an automobile.

BACKGROUND OF THE INVENTION

One known pull-type clutch cover assembly includes a release bearing assembly which can be mounted or removed by engaging or disengaging the bearing body of the assembly with a diaphragm spring-holding ring. The bearing body acting as a friction clutch is mounted so as to be axially movable within a given range. The release bearing assembly can be divided into parts in this way to secure space which permits the transmission to be mounted and removed easily.

Japanese Patent Laid-Open No. 37522/1987 discloses an automotive friction clutch of this type. The release bearing assembly of this clutch is shown in FIG. 10, where the body of the bearing is coupled to a retainer ring. In this state, a hub or inner ring 7 is kept in engagement with the retainer ring 3 by the interposition of a split ring 4 which is an annular spring having a partially cutaway circular cross section. In order to disassemble the release bearing assembly, a split cylindrical sleeve 5 having an inclined and thinned front end portion is moved with the hub 7 in the direction indicated by the arrow B, or to the left as viewed in FIG. 11. The ring 4 is pushed and spread between the inclined portion of the sleeve 5 and the wall forming a groove 10 that is formed in the retainer ring 3. The ring 4 is so placed as to ride on the outer periphery of the sleeve 5. Under this condition, the hub 7 is moved in the direction indicated by the arrow A, or to the right as viewed in FIG. 11. The ring 4 can ride across a protrusion 26 formed at the front end of the hub, so that the hub 7 and the retainer ring 3 can be disassembled. When reassembly is performed, the split ring 4 is placed in the groove 10 formed in the retainer ring 3. The hub 7 is moved toward the retainer ring 3. Thus, the split ring 4 is spread by the inclined front end portion 11 of the hub 7 and permitted to ride across the protrusion 26. A stopper 6 is formed between the hub 7 and the retainer ring 3 to prevent them from moving toward each other. This, in turn, prevents the split ring 4 from coming off during operation.

The above-described release bearing of the friction clutch requires three parts for disassembly and assembly, i.e., the split ring 4, the split cylindrical sleeve 5, and the stopper 6. Since the numerous parts are needed, any one of them frequently fails to be mounted after disassembly. If the sleeve 5 fails to be mounted, the assembly cannot be disassembled after the assembly operation is completed. If the stopper 6 fails to be mounted, the assembly will be disassembled due to vibration during the operation. In this way, various problems occur. Also, the split ring 4 must be fabricated to a very close tolerance because of the relation between the inside diameter of the retainer ring 3 and the outside diameter of the hub 7. In addition, if the friction produced between the ring 4 and the sleeve 5 is not greater than the friction produced between the split cylindrical sleeve 5 and the hub 7, then the sleeve 5 disengages from the ring 4 at the final step of disassembly operation, i.e., when the hub 7 is moving in the direction indicated by the arrow A. Then, the diameter of the ring 4 decreases. As a result, the hub 7 and the ring 3 cannot be removed. Another problem is that the sleeve 5 is required to be moved to the right relative to the hub 7 during reassembly.

SUMMARY OF THE INVENTION

It is an object of the invention to provide a release bearing assembly which is free of the foregoing problems.

It is a more specific object of the invention to provide a release bearing assembly which forms a part of a clutch cover assembly and which is made up of a less number of components than heretofore and less likely to be incompletely assembled by forgetting to mount any one of the components.

It is another object of the invention to provide a release bearing assembly which does not come off during operation to thereby assure safety driving and which can be disassembled without trouble and with a reduced number of steps.

It is a further object of the invention to provide a release bearing assembly including parts which are used for disassembly and not required to be fabricated to very close tolerances but capable of performing their functions satisfactorily.

The above object is achieved by a release bearing assembly comprising: a first member capable of moving axially within a given range; a second member that is annular and can come into and out of engagement with the first member; a sleeve that is mounted between the first member and the second member and capable of sliding axially on the first member between a first terminal close to the second member and a second terminal; a plurality of resilient sheets extending axially of the sleeve, each of the resilient sheets having a groove and a front end portion; clamping means which are mounted at the front ends of the resilient sheets and which, when the sleeve is in the first terminal close to the second member, clamp together the first and second members; and disengaging means which are formed in the first member and which, when the sleeve is not in the first terminal, permit the first member to be moved in response to sliding movement of the second member and the clamping means to disengage the first member from the second member.

In assembling the release bearing assembly, when the sleeve is in the first terminal close to the second member and the front end portions of the resilient sheets of the sleeve are held between the shoulder portions of the first and second members, these two members are pushed at right angles to the axis and coupled together because of the thickness of the front end portions of the resilient sheets mounted between the first and second members. Thus, the clutch is made usable.

In disassembling the release bearing assembly, the first member is moved toward the sleeve and toward the second member. When the first member arrives at a position different from the first terminal, preferably the second terminal, the resilient sheets are pressed into the release groove in the first member by the second member such that the resilient sheets can play within the groove. Therefore, the first and second members are coupled together with a weaker force. This permits the second member and fingers at the front ends of the resilient sheets to slide and so the first member can be moved away from the second member together with the sleeve. In this way, the first member disengages from the second member. As a result, the transmission can be removed.

Other objects and features of the invention will appear in the course of the description thereof which follows.

BRIEF DESCRIPTION OF THE DRAWINGS

FIGS. 12–16 are cross sections of a release bearing assembly including a sleeve having a reinforcing member, for showing the procedure for disassembling and assembling the assembly built in accordance with the invention;

FIG. 17 is a side elevation in cross section of a sleeve and a reinforcing member used in the invention;

FIG. 18 is a front elevation of the sleeve and the reinforcing member shown in FIG. 17;

FIG. 19 is a side elevation of the sleeve and the reinforcing member shown in FIG. 17; and FIG. 20 is a cross section of a release bearing assembly according to the invention, for showing the manner in which the assembly is disassembled.

DETAILED DESCRIPTION OF THE INVENTION

Figure 9:
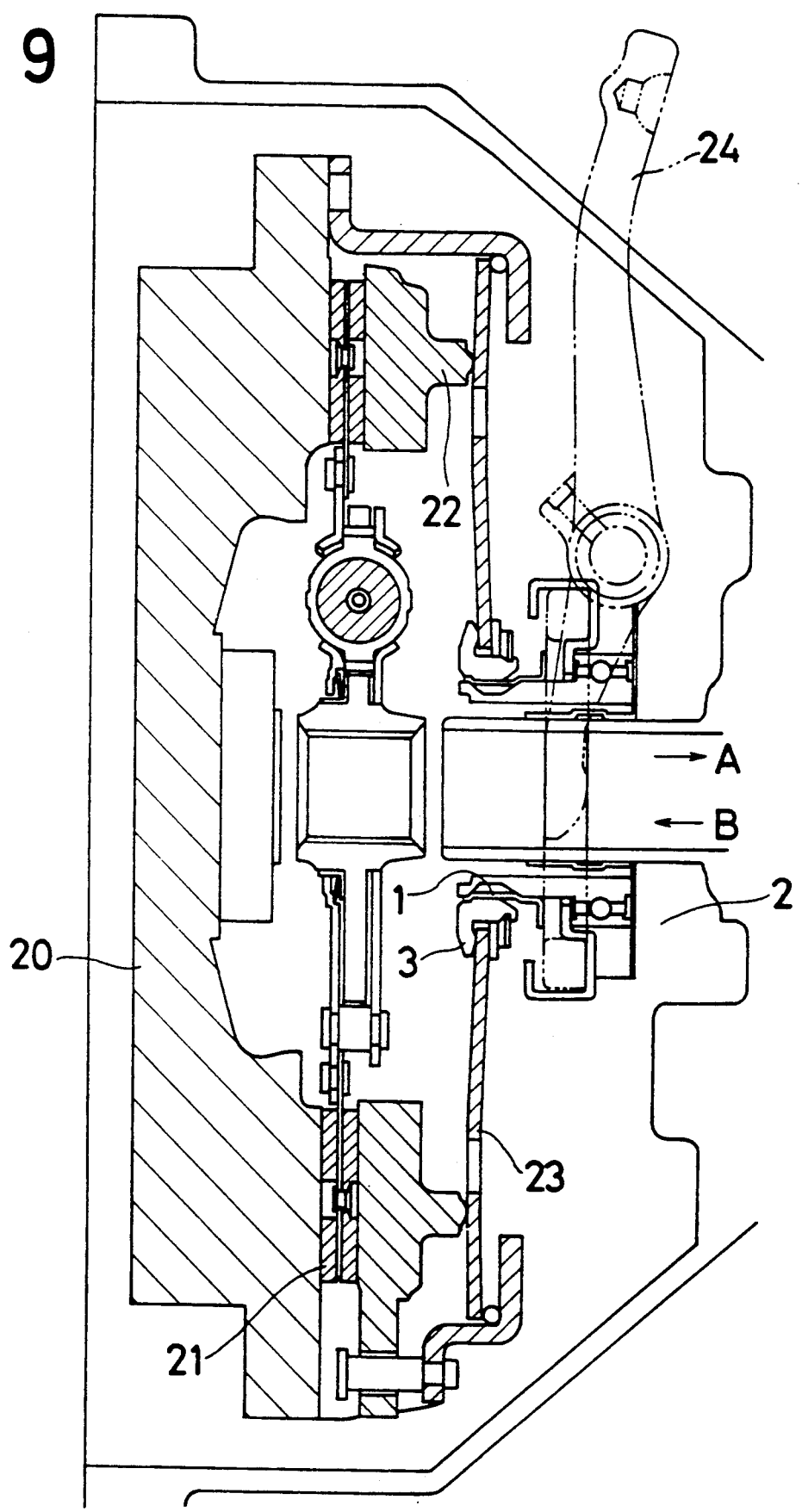
FIG. 9 is an axial cross section of main portions of a friction clutch including a release bearing assembly according to the invention.
Figure 14:
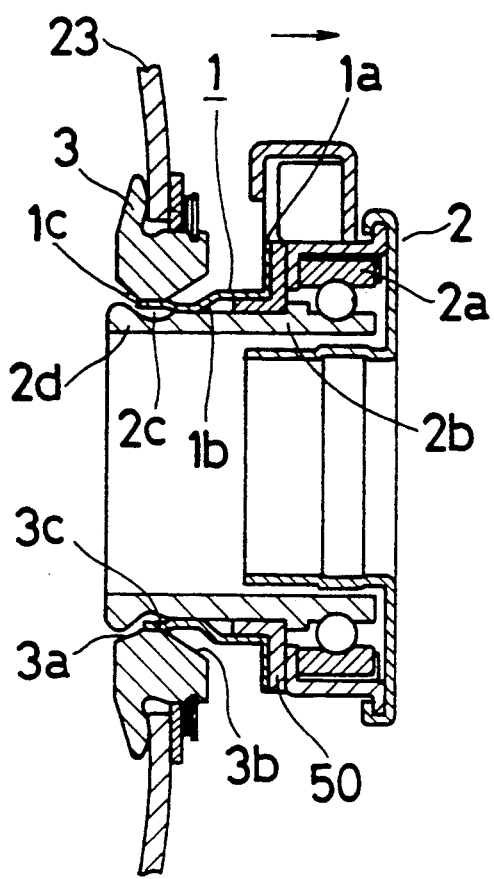
Figure 15:
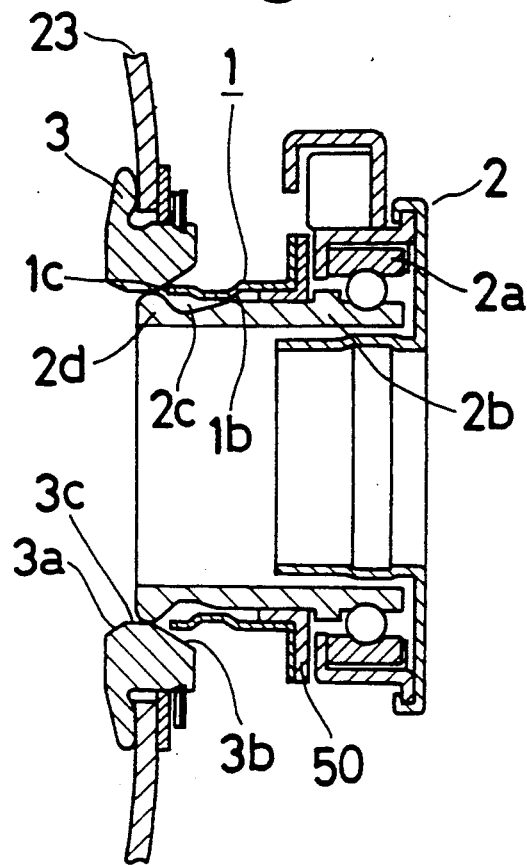

Referring to FIG. 9, there is shown a friction clutch installed in an automobile. This friction clutch comprises a flywheel 20 for transmitting rotary motion of the engine, a clutch disk 21 to which the rotary motion is transmitted, a pressure plate 22 for pressing the clutch disk 21 against the flywheel 20, and a release fork 24 for moving a diaphragm spring 23 away from the pivot of the pressure plate 22 in the direction indicated by the arrow A, or to the right, to disengage the clutch. The diaphragm spring 23 applies a pushing force to the pressure plate 22 via its pivot. The spring 23 is held to a retainer ring 3 that forms one component of a release bearing assembly included in a pull-type clutch cover. The ring 3 engages with a bearing body 2 forming a part of the release bearing assembly. A sleeve 1 is mounted between the inner race 2b of the bearing body 2 and the retainer ring 3. Fingers mounted at the front end of the sleeve 1 act to clamp the release bearing assembly.

Figure 1:
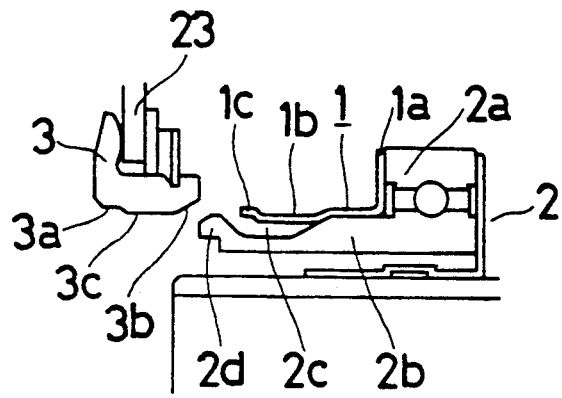
FIG. 1 is an exploded axial cross section of a release bearing assembly according to the invention.

In the condition shown in FIG. 1, the sleeve 1 is inserted in the inner race 2b of the bearing body (first member) 2 before the release bearing assembly is assembled. The bearing body 2 is divided into an outer race 2a and the inner race 2b at the position of a bearing. A release groove 2c is formed in the center of the outer surface of the inner race 2b. A shoulder portion 2d is formed at the front end of the inner race 2b.

A conical notch 3b is formed around the front end of the retainer ring (second member) 3 holding the diaphragm spring 23 to permit the ring 3 to be easily inserted into the inner race 2b. A shoulder portion 3a formed around the rear end of the ring 3 is a step that is slightly lower than the inner surface 3c of the ring 3.

The sleeve 1 has a flange 1a bearing against a side surface of the outer race 2a of the release bearing body 2. The sleeve 1 can move between its two terminals. In the condition shown in FIG. 1, the sleeve 1 is in one of the terminals.

Figure 8:
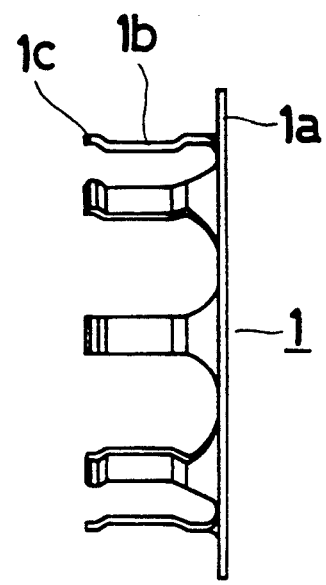
FIG. 8 is a side elevation of a sleeve used in the invention.
Figure 10:
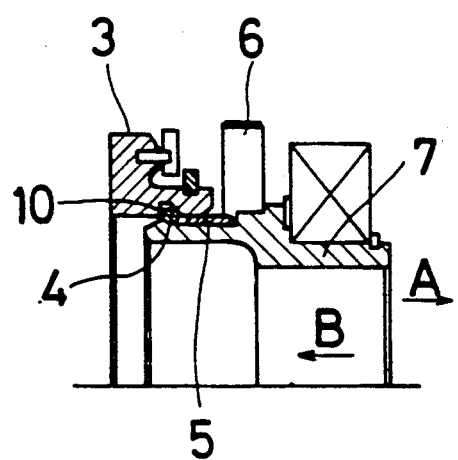
FIG. 10 is an axial cross section of a known release bearing assembly.
Figure 11:
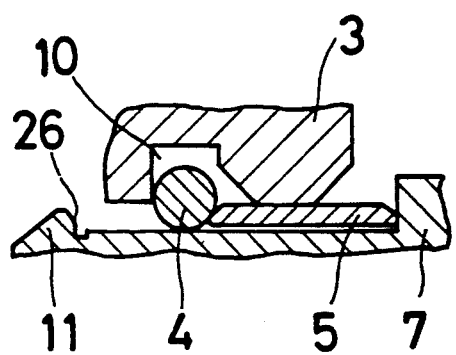
FIG. 11 is a cross section of the release bearing assembly shown in FIG. 10, for showing the manner in which the assembly is disassembled, and in which the hub has been moved.

Referring also to FIG. 8, the sleeve 1 of steel has the flange 1a from which 8 resilient sheets 1b extend axially of the sleeve 1. Each resilient sheet 1b has a bent portion to form a groove bottom portion having a length corresponding to the bottom surface 3c of the retainer ring 3. A finger having a step corresponding to the step of the shoulder portion 3a of the ring is formed around the front end 1c of each resilient sheet 1c.

Figure 2:
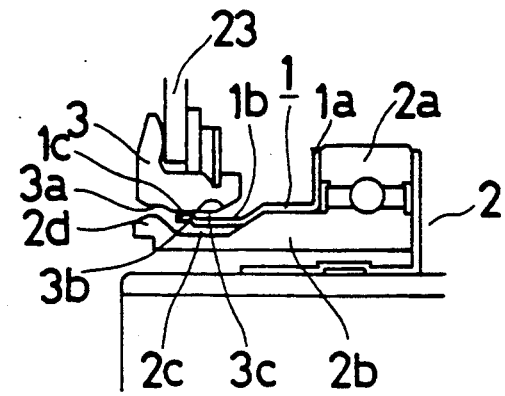
FIGS. 2–6 are cross sections of the release bearing assembly shown in FIG. 1, showing the procedure for disassembling and assembling the release bearing assembly shown in FIG. 1.
Figure 3:
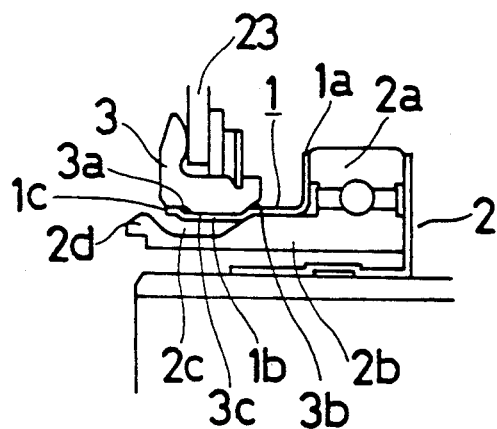
Figure 4:
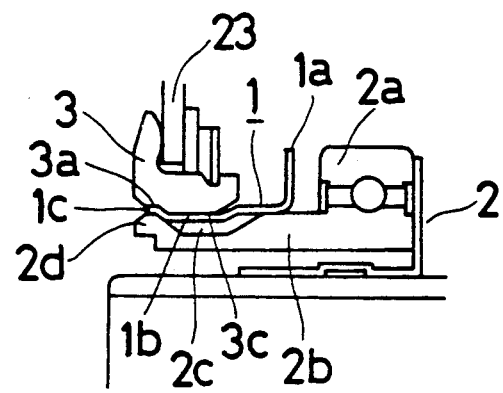

After the assembly has assumed the condition shown in FIG. 1, the inner race 2b of the release bearing body 2 is moved in the direction indicated by the arrow B, or to the left. The assembly takes the condition shown in FIG. 2 and then assumes the condition shown in FIG. 3. That is, the retainer ring 3 is inserted in the inner race 2b. In the condition shown in FIG. 2, the innermost surface 3c of the ring 3 pushes the fingers 1c at the front ends of the sleeve radially inwardly to resiliently force the resilient sheets 1b of the sleeve 1 into the release groove 2c in the inner race 2b in such a way that the resilient sheets can sufficiently play within the groove. In the condition shown in FIG. 3, the inner surface 3c of the ring 3 engages grooves formed in the resilient sheets 1b of the sleeve 1. The shoulder portion 3a of the ring 3 engages the front end portion 1c of each resilient sheet 1b. Subsequently, the release bearing body 2 is moved in the direction indicated by the arrow A, or to the right, while spreading the space between the flange 1a of the sleeve 1 and the side of the outer race 2a with a tool. In the condition shown in FIG. 4, the shoulder portion 2d of the inner race 2b is held to the shoulder portion 3a of the retainer ring 3 via the front end portion 1c of the sleeve 1. The release bearing assembly is clamped in this way, and the clutch is used.

Figure 5:
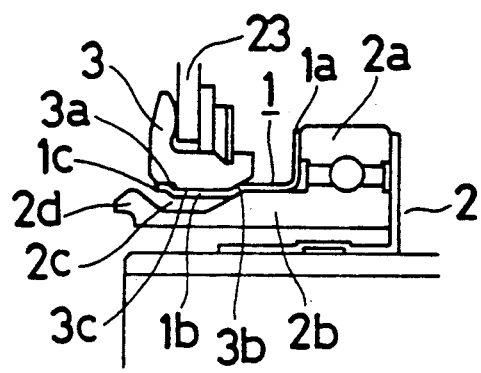
Figure 6:
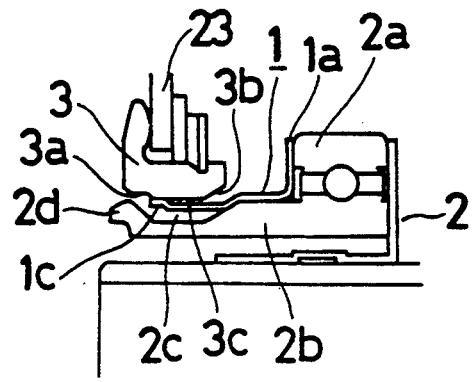

When the transmission is removed, it may be necessary to disassemble the release bearing assembly. In the condition shown in FIG. 4, the release bearing body 2 is moved in the direction indicated by the arrow B toward the retainer ring 3 while pulling the sleeve 1 and the inner race 2b with a tool. As a result, the shoulder portion of the inner race 2b disengages from the shoulder portion of the ring 3 (FIG. 5). Then, the inner race 2b is moved with the sleeve 1 in the opposite direction, i.e., in the direction indicated by the arrow A. The ring 3 moves away from the inner race 2b and away from the sleeve 1 while forcing the resilient sheets 1b into the release groove 2c in the inner race 2b (FIG. 6). The condition shown in FIG. 1 is resumed. In this state, the release bearing assembly has been disassembled, and the transmission is removed.

Figure 7:
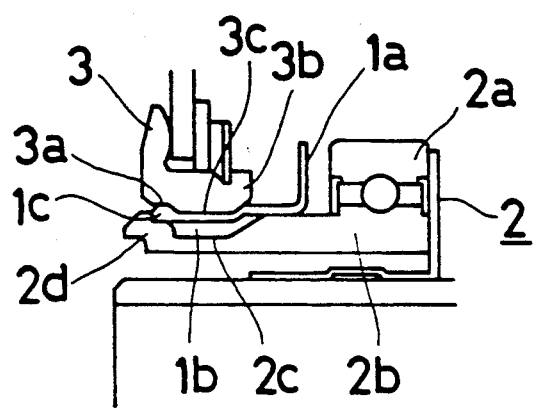
FIG. 7 is a side elevation of another release bearing assembly according to the invention.

FIG. 7 shows the structure of another release bearing assembly according to the invention. In this case, the sleeve 1 has resilient sheets 1b each having a thick front end portion 1c. Therefore, the retainer ring 3 makes better engagement with the inner race 2b, but this assembly is somewhat more expensive to fabricate than the assembly described above.

When the transmission is removed as described above, a tool 60 such as a screwdriver is put between the retainer ring 3 and the flange 1a of the sleeve. The flange 1a of the sleeve is moved in the direction indicated by the arrow A. The front end portion 1c of the ring 3 rides on the inner surface 3c of the ring 3, so that the ring 3 moves away from the sleeve 1 (FIG. 20). However, those portions of the flange 1a of the sleeve and the inner race 2a which are placed in position may be deformed by the tool. If so, a uniform force does not act on the whole outer periphery of the flange 1a of the sleeve. In the worst case, the retainer ring 3 cannot be separated from the sleeve 1. In this case, the cover must be provided with holes arranged in the whole outer periphery of the cover to receive the tool such as a screwdriver.

In order to avoid this problem, a cylindrical reinforcing member 50 which bears against the flange 1a of the sleeve and against the boss in the inner surface is coupled to the sleeve 1, as shown in FIGS. 17-19. The reinforcing member 50 has a flange 50a whose outer surface agrees in radial position with the outer surface of the flange 1a of the sleeve to prevent radially outward expansion. The boss 50b of the inner surface extends close to the resilient sheets 1b of the sleeve to assure the function of the resilient sheets 1b. The flange 1a of the sleeve and the inner race 2a are prevented from deforming by using the sleeve 1 in conjunction with the reinforcing member 50. Also, certain strength is secured. Therefore, when the sleeve 1 is moved, a uniform force acts on the whole outer periphery of the flange 1a to permit the whole flange to deform. This assures that the retainer ring 3 is separated from the sleeve 1.

Figure 16:
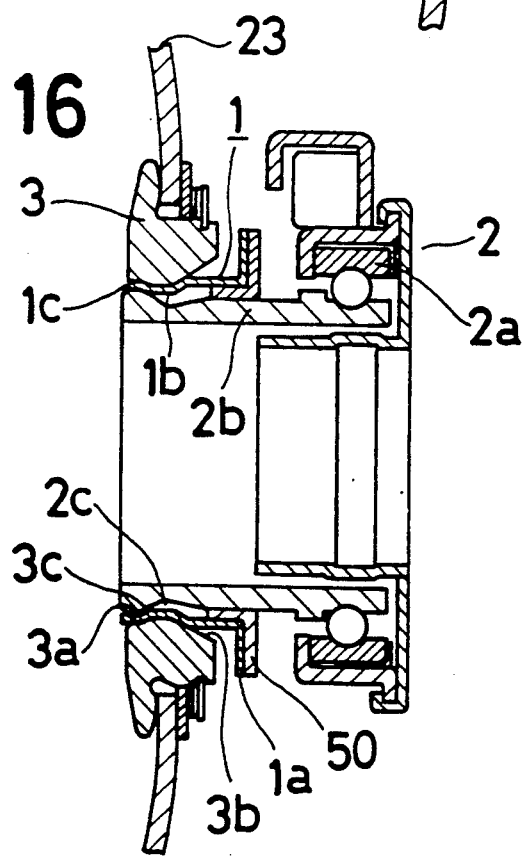

FIGS. 12-15 show individual steps for disassembling the release bearing assembly when the transmission is removed. These figures correspond to FIGS. 4-5. FIG. 16 shows the condition in which the release bearing assembly is clamped, corresponding to FIG. 5. Under this condition, the clutch is used.

In the novel release bearing assembly, the sleeve is mounted between the first member and the second member and capable of sliding on the first member. The sleeve has a plurality of resilient sheets each having a front end portion. When the sleeve is in the first terminal which is on the side of the second member and located on the first member, the front end portion of each resilient sheet is held between the shoulder portions of the first and second members to clamp together these two members. When the sleeve is not in the first terminal, the resilient sheets are pressed into the release groove formed in the first member by the second member. Consequently, the part which makes the release bearing assembly disassemblable is only the sleeve that is not required to be fabricated to a very close tolerance. Hence, the number of the components can be reduced. This enables a reduction in the number of assembly steps. Furthermore, it is impossible that any part fails to be inserted during assembly operation. Also, the possibility that the assembled release bearing cannot be disassembled has been eliminated. Further, it is unlikely that the release bearing assembly comes off due to vibration during operation.

What is claimed is:
1. A release bearing assembly comprising:
 a first member capable of moving axially within a given range;
 a second member that is annular and can come into and out of engagement with the first member;
 a sleeve that is mounted between the first member and the second member and capable of sliding axially on the first member between a first terminal close to the second member and a second terminal;
 a plurality of resilient sheets extending axially of the sleeve, each of the resilient sheets having a groove and a front end portion;
 clamping means which are mounted at the front ends of the resilient sheets and which, when the sleeve is in the first terminal close to the second member, clamp together the first and second members; and
 disengaging means which are formed in the first member and which, when the sleeve is not in the first terminal, permit the first member to be moved in response to sliding movement of the second member and the clamping means to disengage the first member from the second member.

2. The release bearing assembly of claim 1, wherein said clamping means include fingers which cause the sleeve to be held between shoulder portions of the first and second members, for clamping together the first and second members.

3. The release bearing assembly of claim 1, wherein said disengaging means include release grooves in which the resilient sheets are loosely inserted when the second member engages the clamping means.

4. The release bearing assembly of claim 1, wherein the front end portion of said sleeve is thicker than any other portion.

5. A release bearing assembly comprising:
 a first member capable of moving axially within a given range;
 a second member that is annular and can come into and out of engagement with the first member;
 a sleeve that is mounted between the first member and the second member and capable of sliding axially on the first member between a first terminal close to the second member and a second terminal;
 a plurality of resilient sheets extending axially of the sleeve, each of the resilient sheets having a groove and a front end portion;
 clamping means which are mounted at the front ends of the resilient sheets and which, when the sleeve is in the first terminal close to the second member, clamp together the first and second members;
 disengaging means which are formed in the first member and which, when the sleeve is not in the first terminal, permit the first member to be moved in response to sliding movement of the second member and the clamping means to disengage the first member from the second member; and
 a cylindrical reinforcing member bearing against the flange of the sleeve and against the axially extending resilient sheets.

6. The release bearing assembly of claim 5, wherein said reinforcing member includes a flange coincident in radial position with the outer surface of the flange of the sleeve and an inner boss extending close to the grooves in the resilient sheets.

* * * * *